Nov. 20, 1928.
C. E. McMANUS
1,692,783
BUILDING SLAB AND METHOD OF MAKING SAME
Filed Nov. 25, 1925
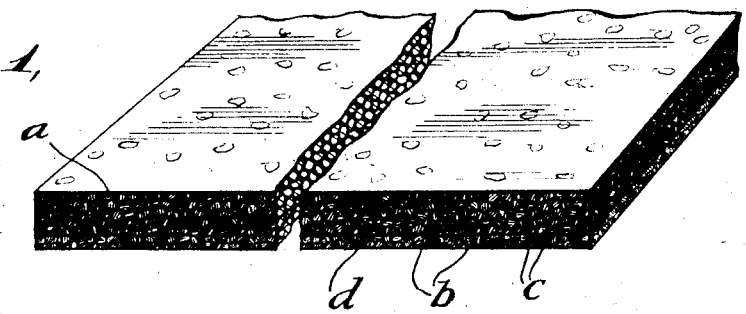
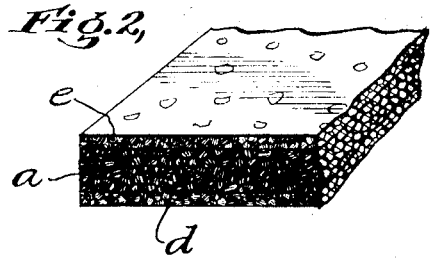
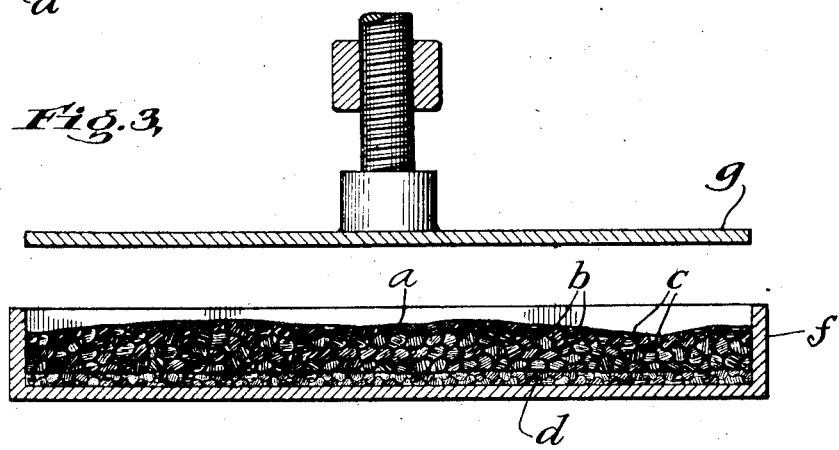
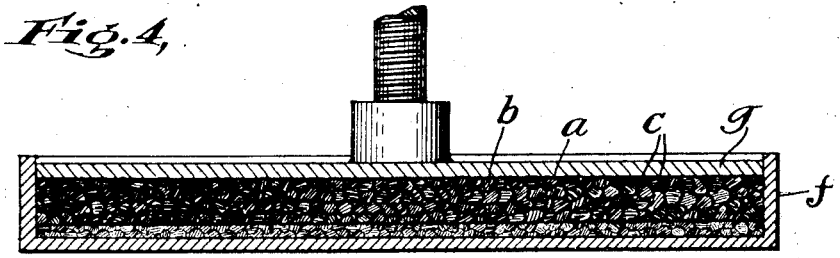
Charles E. McManus INVENTOR
Frank P. Wentworth
his ATTORNEY.

Patented Nov. 20, 1928.

1,692,783

UNITED STATES PATENT OFFICE.

CHARLES E. McMANUS, OF NEW YORK, N. Y., ASSIGNOR TO CROWN CORK & SEAL COMPANY, INC., OF NEW YORK, N. Y., A CORPORATION OF NEW YORK.

BUILDING SLAB AND METHOD OF MAKING SAME.

Application filed November 25, 1925. Serial No. 71,300.

My invention relates to building slabs consisting mainly of a body consisting of granular material such as cork, the granules of which are bonded together by means of a plaster cement, and in the method of producing such slabs.

Slabs embodying the invention are designed for use as a wall covering as in making thin partitions, and by using granular cork in the body of the slab it will be a homogeneous mass of substantially uniform density throughout, and will have inherent properties of being non-inflammable, non-conductive of electricity, non-resonant or soundproof, and an effective heat insulator. Such slabs will also be light of weight and sufficiently resilient to be non-frangible and thus avoid likelihood of the breakage of the slab as it is being nailed in place upon firring strips or lathing, while permitting the slabs to be readily cut to facilitate the fitting of adjacent slabs when covering a wall. United with this body portion is a surface stratum or facing of composition cork which is firmly secured to the body portion by means of the plaster cement used for binding the granules of the body together, this facing sheet being used to impart finish to the article and in a measure to protect the body of the cement from such atmospheric conditions as would cause the plaster of the composition of the body to absorb moisture. This facing gives a more permanent finish to the slab, and a more attractive finish, since in the formation of these sheets they are sliced from a slab, the cut cork not only being brighter than the exposed area of the cork granules of the slab from which the sheets are cut, but brighter than the exposed areas of the cork granular filler of the body of the building slab.

This facing possesses all of the characteristics inherent to the body of the slab with the added characteristic that it is, throughout, no more absorptive than is natural cork wood, since cements ordinarily used in producing the slabs from which these sheets are cut, are relatively less absorptive than is a plaster cement and the exposed cement areas in such sheets are relatively less than the exposed cement areas at the surface of the body of the slab. Both sides of the slab may be faced if desired, so as to permit the use of these slabs as partitions, under which circumstances opposite sides of the slab are exposed within different room spaces.

The slabs are produced by a method which will ensure the simultaneous bonding together of the granules of the granular filler of the body of the slab, and of the facing sheet or sheets to the body portion of the slab, thus securing an integral slab structure having the desired characteristics. By this method the constituents of the slab are subjected to a continued pressure until the cement has set by crystallization, thus securing the desired uniform density in the body of the slab, and the desired penetration of the plaster cement into the pores of the granules of the filler and the cork particles of the facing sheet or sheets with a resultant firm anchorage of the cement to this matter when set.

The invention consists primarily in a building slab embodying therein a body portion composed of a granular filler, the granules of which are bonded together by a plaster cement, and a thin facing or outer stratum consisting of a sheet of composition cork bonded to said body portion through the medium of the cement binding the granules of said body portion together; and in such other novel characteristics, and in the novel steps and practices of producing said slabs, all as hereinafter set forth and described, and more particularly pointed out in the claims hereto appended.

Referring to the drawings,

Fig. 1 is a perspective view of a portion of a building slab embodying the invention with one side only thereof provided with a facing sheet;

Fig. 2 is a similar view with both sides thereof provided with facing sheets; and Figs. 3 and 4 are illustrative of the method of producing such slabs.

Like letters refer to like parts throughout the several views.

In the embodiment of the invention shown in the drawings, the body of the slab $a$ is composed of granular cork, the granules $b$ of which are bonded together by means of a plaster cement indicated at $c$ in the drawings, this body consisting of a homogeneous mass of cork granules and plaster cement having substantially uniform density throughout, and possessing a high degree of resiliency.

The cork granules may and preferably are formed of waste cork such as cork wood sufficiently aged to have voids therein of a magnitude sufficient to preclude their use in the production of cut bottle stoppers and similar articles, or the residue from the production of granular cork from the waste of high grade cork used for the manufacture of cut bottle stoppers. Higher grades of cork than this waste may be used if desired, although this wastes possesses sufficient resiliency to secure a building slab having the desired characteristics, and where appearance is no factor, the use of high grades of cork is neither desirable nor necessary.

Equal proportions of cork and plaster cement, which latter consists of calcium sulphate or the ordinary plaster of Paris of commerce, have been found to give highly satisfactory results, said cement being crystallized and being firmly anchored to adjacent cork granules.

The bulk of the cork in this body is approximately ten times the bulk of the cement, thus causing the cement to be in the form of a thin film substantially enveloping every granule of cork.

Either, or both faces of the slab has firmly secured thereto by means of the plaster cement bonding the granules of cork in the body together, a thin facing sheet or outer stratum of highly flexible composition cork. This sheet is formed of granular cork, the granules of which are bonded together by means of a non-plaster cement. Each sheet is cut or sliced from a slab of composition cork, so as to have large areas of cork granules exposed throughout same. Various cements are used for the production of composition cork, some of these having a glue or gelatin base containing glycerin, and others having an albumen base, either egg or blood albumen.

Each manufacturer of composition cork articles is familiar with these different cements, and it is therefore not my intention to limit myself in any way to use of any particular cement for bonding the cork granules or the portions thereof contained in each sheet, together. By using the calcium sulphate in the body of the slab, as a cement for uniting the facing sheet or sheets indicated at $d$—$e$ in the drawings to this body, I secure a unitary structure, or one in which the facing sheet forms a substantially integral part of the slab.

At the same time, the exposed face of the slab, when in use, will be much brighter than is the face of a slab consisting solely of granular cork and a plaster cement, and this face will have a relatively higher resiliency than will the body of the slab.

In actual practice I have gotten highly satisfactory results by making the body of the slab approximately $3/8$ to $1/16$ of an inch in thickness, and using a facing sheet of about $1/16$ of an inch in thickness.

The composition cork material of which the facing sheet is made is substantially non-adsorptive, either glue or albumen cements taking up moisture less rapidly than will a plaster cement.

In Fig. 1 of the drawings, I have shown a slab with only one face thereof provided with a composition cork facing sheet or outer stratum, but it is apparent that if desired, both faces may have such a sheet, such a slab being shown in Fig. 2 of the drawings, and the second facing sheet being indicated at $e$.

I produce building slabs embodying the invention by a method which consists of the thorough admixture of the granular cork and the calcium sulphate while dry and the subsequent addition of water in excess of that required as water of crystallization in the setting of the calcium sulphate. As stated, substantially equal proportions by weight of the granular cork and the calcium sulphate are used the quantity of water used being approximately one-half of that, by weight, of the calcium sulphate.

When the water is added, the batch is rapidly mixed to form a plastic or semi-fluid mass which may be readily poured into a mould $f$. A sheet $d$ of a composition cork, cut or sliced from a slab, is placed in the bottom of the mould and laid perfectly smooth therein. The plastic or semi-fluid mass is poured into the mould upon this sheet and will distribute itself about the mould in substantial uniformity as to thickness. The mould is then placed under a platen $g$ through which a slight, or low, pressure, of from about fifteen to thirty pounds, is applied to the mass of material within the mould. The effect of this pressure is to rapidly complete an equal distribution of the mass throughout the mould while at the same time placing the cork granules in the composition, which is to form the body of the slab, and the cork granules of the sheet of composition cork, under slight compression. The pressure applied through the platen $g$ will force the plastic cement into intimate engagement with each cork granule and bring about a condition of substantial density throughout the mass of cork and cement forming the body of the slab. This pressure will also express from the plastic or semi-fluid mass, water in excess of that required for the crystallization of the calcium sulphate in setting, but is insufficient to interfere with the setting of said calcium sulphate by crystallization.

The pressure from the platen $g$ is maintained for only a short interval of about fifteen seconds, which it has been found would give a satisfactory product, and to afford ample time for the crystallization of the calcium sulphate. The setting of the calcium sulphate under pressure will cause this cement to penetrate the pores of the cork granules in the body of the slab and also in the sheet $d$, and also any small interstice in or through said sheet, thus causing the anchoring of the cement to the cork granules in the body of the slab, but also the cork constituent of the facing sheet or outer stratum $d$.

Instead of placing the sheet $d$ in the bottom of the mould, the plastic or semi-fluid mass may be poured directly in the mould and the sheet $d$ placed upon the top of this batch so as to cause the application of pressure from the platen $g$ to the plastic or semi-fluid mass, through this sheet, the effect in either instance being that the granular cork in the batch and the cork constituent of the facing sheet will be simultaneously placed under a slight compacting pressure to cause that desired slight compaction or compression of the cork constituent of each, desirable in securing a product having the desired resiliency.

Calcium sulphate in setting by crystallization, will expand slightly and this expansion is relied upon to impart a slight additional compaction to the cork constituent of the slab whether in the body or in the facing sheet, and to ensure the desired penetration of the calcium sulphate into the pores of the cork granules of the body and of the cork of the facing sheet and any other minute interstices which may be present in or through said sheet. This expansion of the calcium sulphate will cause a readjustment of the cork granules throughout the body of the slab, and an equalization of the degree of compression of the different granules, thus ensuring substantial uniformity in the density throughout the entire body of the slab.

If both faces of a slab are to be finished with a cork sheet, one sheet of cork $d$ will be placed in the bottom of the mould and the other sheet $e$ will be placed upon the top of the plastic or semi-fluid mass, in the mould and upon the other sheet $d$, thus securing the same compressive and bonding conditions as to both facing sheets or outer strata.

It it be desired to retard the setting of the calcium sulphate, a small percentage of citric acid, or glue or gelatin may be added to the water before the same is mixed with the mixture of granular cork and calcium sulphate, such ingredients, however, being used only as retarding agents and not for modifying the bonding action of the calcium sulphate. Such other ingredients are merely for modifying the time element in the setting stage of the calcium sulphate and the use of them when possible is better avoided.

While I have herein specifically referred to the use of granular cork as the filler for the body of the slab, other slightly compressible granular substances may be used in lieu thereof, although to secure a product having all of the desired properties as herein stated, the use of granular cork is essential.

It is not my intention to limit myself to the exact proportions of granular cork, calcium sulphate and water when making the plastic or semi-fluid batch, nor to the exact pressure exerted through the platen $g$, as such is subject to variation while still giving highly satisfactory results. The particular binder used in producing the slab from which the composition cork sheets for the outer strata are cut or sliced, is also immaterial to the invention, as many well known cements are capable of such use.

The temperatures required during the practice of the method are immaterial to the invention, normal factory temperatures prevailing.

Having described the invention, what I claim as new and desire to have protected by Letters Patent, is:—

1. A building slab embodying therein a body portion composed of a granular filler, the granules of which are bonded together by a plaster cement, and a thin facing or outer stratum consisting of a previously formed sheet of composition cork bonded to said body portion through the medium of the cement binding the granules of said body portion together.

2. A building slab embodying therein a body portion composed of granular cork, the granules of which are bonded together by crystallized calcium sulphate, and a thin facing or outer stratum of composition cork, bonded to said body portion through the medium of the crystallized calcium sulphate.

3. A building slab embodying therein a body portion composed of granular cork, each of the granules of which is enveloped by a thin surface coating of crystallized calcium sulphate, and a thin facing or outer stratum of composition cork bonded to said body portion through the medium of the crystallized calcium sulphate.

4. A building slab embodying therein a body portion composed of granular cork, each of the granules of which is enveloped by a thin surface coating of crystallized calcium sulphate, the cork granules being held under compression by said enveloping coating of crystallized calcium sulphate, and a thin facing or outer stratum of composition cork bonded to said body portion through the medium of the crystallized calcium sulphate.

5. A building slab body therein a body portion composed of granular cork, each of the granules of which is enveloped by a thin surface coating of crystallized calcium sulphate, the cork granules being held under compression by said enveloping coating of crystallized calcium sulphate, the portions of cork and calcium sulphate by bulk being substantially ten to one, and a thin facing or outer stratum of composition cork bonded to said body portion through the medium of the crystallized calcium sulphate.

6. The herein described method of making building slabs consisting in bringing a semi-fluid batch of granular material and a plaster cement within a mould cavity and in intimate surface contact with a previously formed thin sheet composed of granular cork and a binder, and subjecting the same to a continuing slight pressure until the cement is set, whereby the granules of said granular material will be bonded together and be simultaneously bonded to said thin sheet.

7. The herein described method of making building slabs consisting in thoroughly admixing substantially equal proportions by weight of granular cork and calcium sulphate, adding water sufficient to form a semi-fluid batch of the mixture, pouring said batch within a mould cavity and bringing it in intimate surface contact with a previously formed thin sheet composed of granular cork and a binder, and subjecting said semi-fluid batch and said sheet to a mechanical pressure below that at which the setting of calcium sulphate by crystallization is prevented, whereby water in excess of water of crystallization is expressed from said calcium sulphate and the cork granules in said batch will be bonded together, and as a mass, will be simultaneously bonded to said thin composition cork sheet.

8. The herein described method of making building slabs consisting in placing a previously formed thin sheet composed of granular cork and a binder, in a mould cavity, thoroughly admixing substantially equal proportions by weight of granular cork and calcium sulphate, adding water to form a semi-fluid batch of the mixture, pouring said batch within the mould cavity upon said thin sheet, and subjecting said semi-fluid batch and said sheet to a mechanical pressure below that at which the setting of calcium sulphate by crystallization is prevented, whereby water in excess of water of crystallization is expressed from said calcium sulphate and the cork granules in said batch will be bonded together, and as a mass, will be simultaneously bonded to said thin composition cork sheet.

9. The herein described method of making building slabs consisting in placing a previously formed thin sheet composed of granular cork and a binder, in a mould cavity, thoroughly admixing substantially equal proportions by weight of granular cork and calcium sulphate, adding water to form a semi-fluid batch of the mixture, pouring said batch within the mold cavity upon said thin sheet, placing a second thin sheet upon top of the fluid batch within the mould cavity and subjecting said semi-fluid batch and said sheets to a mechanical pressure below that at which the setting of calcium sulphate by crystallization is prevented, whereby water in excess of water of crystallization is expressed from said calcium sulphate, and the cork granules in said batch will be bonded together, and as a mass, will be simultaneously bonded to both of said composition sheets.

10. The herein described method of making building slabs consisting in thoroughly admixing substantially equal proportions by weight of granular cork and calcium sulphate, adding water sufficient to form a semi-fluid batch of the mixture, pouring said batch within a mould cavity and bringing it in intimate surface contact with a previously formed thin sheet composed of granular cork and a binder, and subjecting said semi-fluid batch and said sheet to a mechanical pressure of from fifteen to thirty pounds, whereby the calcium sulphate is permitted to set by crystallization, water in excess of water of crystallization is expressed from said calcium sulphate and the cork granules in said batch will be bonded together, and as a mass, will be simultaneously bonded to said thin composition cork sheet.

11. The herein described method of making building slabs consisting in placing a previously formed thin sheet composed of granular cork and a binder, in a mould cavity, thoroughly admixing substantially equal proportions by weight of granular cork and calcium sulphate, adding water to form a semi-fluid batch of the mixture, pouring said batch within the mould cavity upon said thin sheet, and subjecting said semi-fluid batch and said sheet to a mechanical pressure of from fifteen to thirty pounds, whereby the calcium sulphate is permitted to set by crystallization, water in excess of water of crystallization is expressed from said calcium sulphate and the cork granules in said batch will be bonded together, and as a mass, will be simultaneously bonded to said thin composition cork sheet.

12. The herein described method of making building slabs consisting in placing a previously formed thin sheet composed of granular cork and a binder, in a mould cavity, thoroughly admixing substantially equal proportions by weight of granular cork and calcium sulphate, adding water to form a semi-fluid batch of the mixture, pouring said batch within the mould cavity upon said thin sheet, placing a second thin sheet upon top of the fluid batch within the mould cavity and subjecting said semi-fluid batch and said sheets to a mechanical pressure of from fifteen to thirty pounds, whereby the calcium sulphate is permitted to set by crystallization, water in excess of water of crystallization is expressed from said calcium sulphate, and the cork granules in said batch will be bonded together, and as a mass, will be simultaneously bonded to both of said composition sheets.

In witness whereof I have hereunto affixed my signature, this 11th day of November, 1925.

CHARLES E. McMANUS.